US012617249B2

(12) United States Patent
Yoon

(10) Patent No.: US 12,617,249 B2
(45) Date of Patent: May 5, 2026

(54) APPARATUS FOR AND METHOD OF CONTROLLING VEHICULAR SUSPENSION AND DAMPER

(71) Applicant: HYUNDAI MOBIS CO., LTD., Seoul (KR)

(72) Inventor: Seung Hee Yoon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 94 days.

(21) Appl. No.: 18/664,816

(22) Filed: May 15, 2024

(65) Prior Publication Data

US 2024/0383298 A1     Nov. 21, 2024

(30) Foreign Application Priority Data

May 19, 2023     (KR) ........................ 10-2023-0064918

(51) Int. Cl.
*B60G 17/0165*     (2006.01)
*B60G 17/016*     (2006.01)
(52) U.S. Cl.
CPC ..... *B60G 17/0165* (2013.01); *B60G 17/0162* (2013.01); *B60G 2400/204* (2013.01); *B60G 2500/10* (2013.01); *B60G 2500/102* (2013.01)
(58) Field of Classification Search
CPC ......... B60G 17/0165; B60G 2400/204; B60G 2500/10; B60G 17/016; B60G 17/0162; B60G 2400/2042; B60G 2500/102
See application file for complete search history.

(56) References Cited

U.S. PATENT DOCUMENTS 11,390,129 B1 * 7/2022 Edren ................ B60G 17/0155
2022/0332306 A1 * 10/2022 Noma ................ B62D 15/0265

FOREIGN PATENT DOCUMENTS

KR     10-2019-0128290 A     11/2019

* cited by examiner

*Primary Examiner* — Jacob M Amick
(74) *Attorney, Agent, or Firm* — Morgan, Lewis & Bockius LLP

(57)     ABSTRACT

Proposed is an apparatus for controlling a vehicular suspension and damper, the apparatus including a navigation module configured to provide a processor with information on a road on which a vehicle travels; and the processor configured to determine, on the basis of curvature radius information among the pieces of information received through the navigation module, whether or not a road ahead is a curved driving road and to determine whether or not the curved driving road ahead is the curved driving road in which it is necessary to control vehicular height, rigidity, and damping of a vehicle, wherein the processor controls the vehicular height, rigidity, and damping of the vehicle according to a preset stepwise control technique when the vehicle reaches a predetermined stepwise control point.

16 Claims, 4 Drawing Sheets

FIG.2

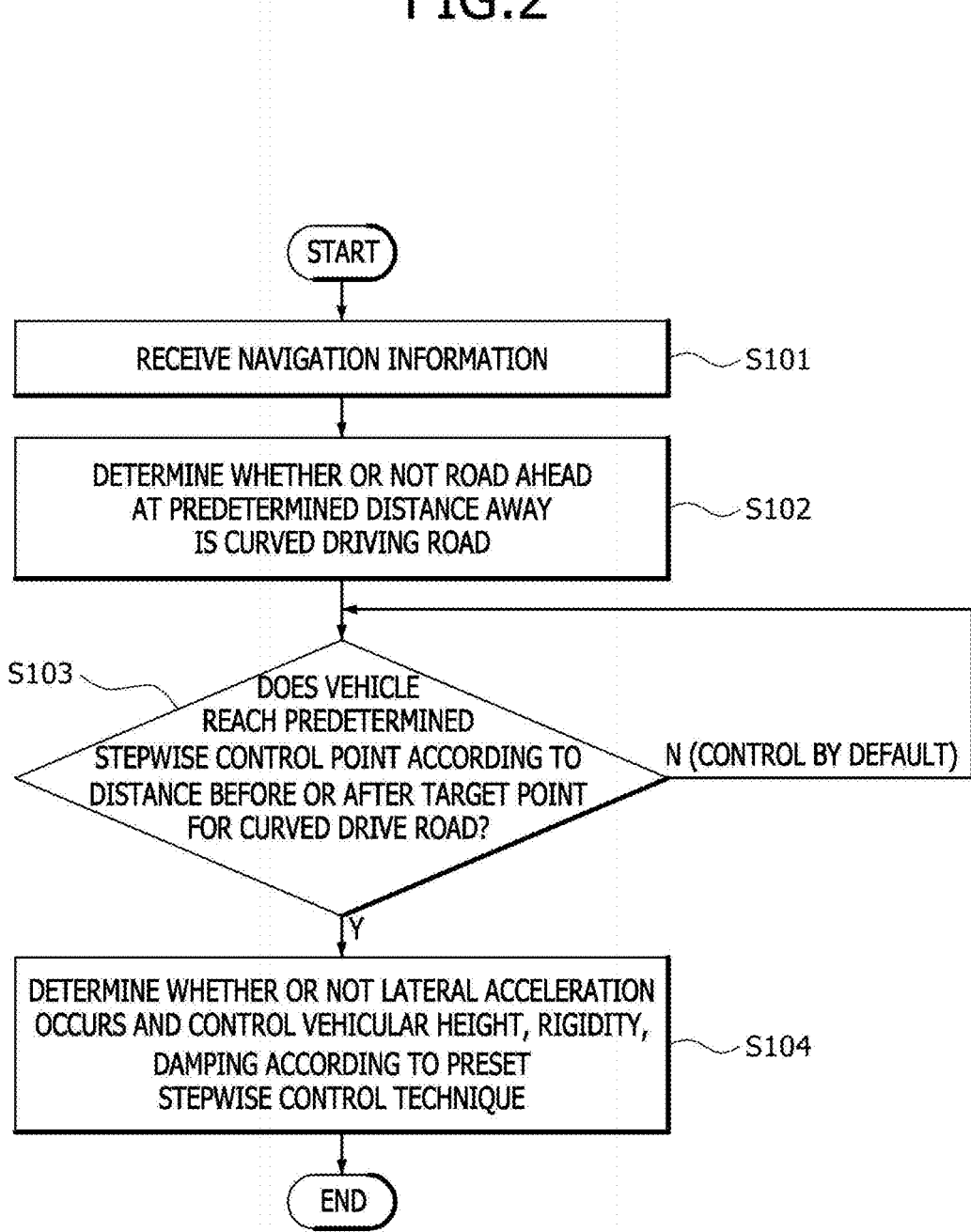

START

RECEIVE NAVIGATION INFORMATION — S101

DETERMINE WHETHER OR NOT ROAD AHEAD
AT PREDETERMINED DISTANCE AWAY
IS CURVED DRIVING ROAD — S102

S103 — DOES VEHICLE
REACH PREDETERMINED
STEPWISE CONTROL POINT ACCORDING TO
DISTANCE BEFORE OR AFTER TARGET POINT
FOR CURVED DRIVE ROAD?

N (CONTROL BY DEFAULT)

Y

DETERMINE WHETHER OR NOT LATERAL ACCELERATION
OCCURS AND CONTROL VEHICULAR HEIGHT, RIGIDITY,
DAMPING ACCORDING TO PRESET
STEPWISE CONTROL TECHNIQUE — S104

END

FIG.3

APPARATUS FOR AND METHOD OF CONTROLLING VEHICULAR SUSPENSION AND DAMPER

CROSS-REFERENCE TO RELATED APPLICATION

This application claims priority from and the benefit of Korean Patent Application No. 10-2023-0064918, filed on May 19, 2023, which is hereby incorporated by reference for all purposes as if set forth herein.

BACKGROUND

Field

Exemplary embodiments of the present disclosure relate to an apparatus for and a method of controlling a vehicular suspension and damper and, more particularly, to apparatus for and a method of controlling a vehicular suspension and damper, the apparatus and the method being capable of controlling a suspension and a damper of a vehicle on a curved driving road on which the vehicle travels, to adjust the feeling of riding comfort.

Discussion of the Background

Typically, a vehicular suspension, also referred to as a suspension system, is installed in such a manner as to be connected to a vehicular axle. The vehicular suspension is configured to include a chassis spring buffering a shock from a road surface, a damper (or a shock absorber) enhancing the feeling of riding comfort by controlling the free vibration of the chassis spring, a stabilizer bar preventing vehicular rolling, and the like.

The damper here connects the vehicular axle and a vehicular body in the vehicular suspension and thus prevents vibration and shock, transferred from the road surface to the vehicular, from being transferred to the vehicular body. Thus, goods loaded onto a vehicular loading bay, as well as the vehicular body, can be prevented from being damaged.

In recent years, electronic controller suspensions (ECS) that automatically adjust the rigidity of the suspension according to the traveling situation and the state of the road surface have been mounted on vehicles. The ECS obtains driving state information, such as vehicle speed, steering angle, and vehicular-body vertical acceleration, as well as road surface information, using various sensors. The ECS can automatically control a spring rate of the suspension, a damping force of the damper, vehicular body positioning, vehicular height, and the like according to the state of the road surface in an electronic manner.

However, vehicles in the related art control the suspension on the basis of the state information of the road surface that can be obtained through a sensor. Because of this, in a case where the vehicle travels a curved driving road that has no relationship with the state of the road surface, the suspension and the damper cannot be controlled to detect the curved driving road or adjust the feeling of riding comfort through the sensor.

The related art of the present invention is disclosed in Korean Patent Application Publication No. 10-2019-0128290 (published on Nov. 18, 2019).

SUMMARY

Various embodiments, which are made to address the above-mentioned problem, are directed to an apparatus for and a method of controlling a suspension and a damper of a vehicle on a curved driving road on which the vehicle travels, to adjust the feeling of riding comfort.

According to an aspect of the present disclosure, there is provided an apparatus for controlling a vehicular suspension and damper, the apparatus including: a navigation module configured to provide a processor with information on a road on which a vehicle travels; and the processor configured to determine, on the basis of curvature radius information among the pieces of information received through the navigation module, whether or not a road ahead is a curved driving road and to determine whether or not the curved driving road ahead is the curved driving road in which it is necessary to control vehicular height, rigidity, and damping of a vehicle, wherein the processor controls the vehicular height, rigidity, and damping of the vehicle according to a preset stepwise control technique when the vehicle reaches a predetermined stepwise control point.

In an embodiment, the apparatus may further include a suspension drive module adjusting the vehicular height by driving the suspension in response to a control signal of the processor; and a damper drive module controlling a damping force of a damper installed between a vehicular body and each axle in response to a control signal of the processor.

In an embodiment, in the apparatus, the processor may determine a plurality of the stepwise control points according to a distance before or after a target point for the curved driving road, which corresponds to a starting point for the curved driving road.

In an embodiment, in the apparatus, the processor may control the vehicular height, rigidity, and damping through control by default or may control the vehicular height, rigidity, and damping according to the preset stepwise control technique, depending on whether or not the vehicle reaches the stepwise control point.

In an embodiment, in the apparatus, the processor may output a vehicular height control enabling signal for starting to control the vehicular height when the vehicle reaches a point at a second distance away from the target point.

In an embodiment, in the apparatus, the processor may gradually output a vehicular height control enabling signal for starting to control the rigidity and damping, according to a predetermined gradient when the vehicle reaches a point at a third distance away from the target point.

In an embodiment, in the apparatus, the processor may control the vehicular height, rigidity, and damping through control by default before the vehicle reaches a point at a second distance away from the target point and after the vehicle passes through an ending point for the curved driving the road.

In an embodiment, in the apparatus, the processor may control the vehicular height, rigidity, and damping in a predetermined condition, but may control the vehicular height to decrease to a lower level than in a current state and controls the rigidity and damping to increase to a higher level than in a current state, under a predetermined first condition (a condition for Mode 1) that a curvature radius R(m) of the curved driving road on which the vehicle currently travels is smaller than a first curvature radius R_big of the curved driving road and equal to or greater than a second curvature radius R-mid (R_mid≤R(m)<R_big) and that a vehicular speed V(m/s) is greater than a first reference speed Vth1 (V(m/s)>Vth1).

In an embodiment, in the apparatus, the processor may control the vehicular height, rigidity, and damping in a predetermined condition, but may control the vehicular height to return to a predetermined normal height and may control the rigidity and damping to return to respective predetermined normal states thereof, under a second condition (a condition for Mode 2) that the curvature radius R(m) of the curved driving road on which the vehicle currently travels is smaller than a second curvature radius R_mid of the curved driving road and equal to or greater than a third curvature radius R-small (R_small≤R(m)<R_mid), and that a vehicular speed V(m/s) is greater than a second reference speed Vth2 (V(m/s)>Vth2).

According to another aspect of the present disclosure, there is provided a method of controlling a vehicular suspension and damper, the method including: receiving, by a processor, information on a road on which a vehicle currently travels, through a navigation module; determining, by the processor, on the basis of curvature radius information among the pieces of received information, whether or not a road ahead is a curved driving road; determining, by the processor, whether or not the road ahead is the curved driving road in which it is necessary to control vehicular height, rigidity, and damping of the vehicle; and controlling, by the processor, the vehicular height, rigidity, and damping of the vehicle according to a preset stepwise control technique when the vehicle reaches a predetermined stepwise control point in a case where the curved driving road is the curved driving road in which it is necessary to control the vehicular height, rigidity, and damping of the vehicle.

According to the present disclosure, the suspension and the damper can be controlled to adjust the feeling of riding comfort.

BRIEF DESCRIPTION OF THE DRAWINGS

FIG. 2 is a flowchart that is referred to for describing a method of controlling a vehicular suspension and damper according to a second embodiment of the present disclosure.

FIG. 3 is a diagram that is referred to for description of the method of controlling the vehicular height, rigidity, and damping of a vehicle according to a preset stepwise control technique when the vehicle reaches a predetermined stepwise control point, the method being illustrated in FIG. 2.

DETAILED DESCRIPTION OF THE ILLUSTRATED EMBODIMENTS

Figure 1:
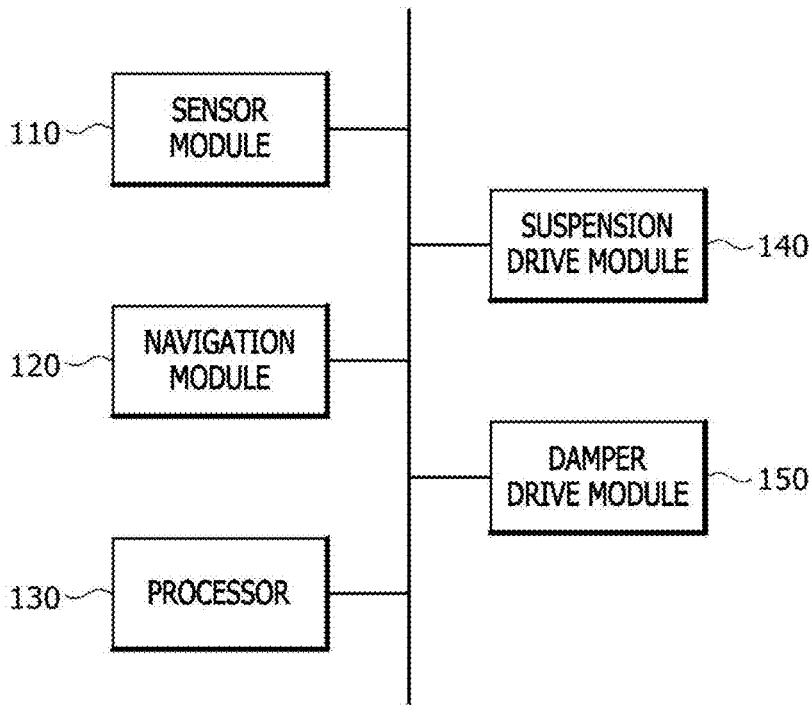
FIG. 1 is a diagram illustrating a schematic configuration of an apparatus for controlling a vehicular suspension and damper according to a first embodiment of the present disclosure.

An apparatus for and a method of controlling a vehicular suspension and damper according to first and second embodiments, respectively, of the present disclosure will be described below with reference to the accompanying drawings.

For clarity and convenience in description, thicknesses of lines, sizes of constituent elements, and the like may be illustrated in a non-exact proportion in the drawings. In addition, terms used hereinafter to refer to constituent elements, respectively, according to the present disclosure are defined by considering their respective functions and may be adjusted according to a user's or manager's intentions or to established practices in the art. Therefore, these terms should be contextually defined in light of the present specification.

FIG. 1 is a diagram illustrating a schematic configuration of the apparatus for controlling a vehicular suspension and damper according to the first embodiment of the present disclosure.

As illustrated in FIG. 1, the apparatus for controlling a vehicular suspension and damper according to the embodiment includes a sensor module 110, a navigation module 120, a processor 130, a suspension drive module 140, and a damper drive module 150. The navigation module 120, the processor 130, the suspension drive module 140, and the damper drive module 150 of the apparatus according to an exemplary embodiment of the present disclosure may be a hardware device implemented by various electronic circuits (e.g., computer, microprocessor, CPU, ASIC, circuitry, logic circuits, etc.). The navigation module 120, the processor 130, the suspension drive module 140, and the damper drive module 150 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The sensor module 110 serves to measure the vehicular behavior. The sensor module 110 includes a plurality of sensors, for example, a vertical acceleration sensor, a vehicular speed sensor, a steering angle sensor, a brake sensor, a throttle position sensor, and the like.

The navigation module 120 provides information (for example, E-CAN information) on roads (an expressway, a low-speed road, a straight-line road, a curved road, and the like) on which the vehicle travels, on the basis of map data.

In addition, the navigation module 120 may receive the information on the roads on which the vehicle travels, from a server (not illustrated) to which the navigation module 120 establishes a connection for wired or wireless communication.

In addition, the navigation module 120 provides the curvature radius information of the road ahead, school zone information, speed bump information, and the like when the vehicle is at a predetermined distance (for example, 2 km) before a target point (for example, a starting point for a curved driving road).

The processor 130 determines, on the basis of information (particularly, curvature radius information of the road) received through the navigation module 120, whether or not a road that is at a predetermined distance (for example, 2 km) is the curved driving road).

In addition, when the road ahead is determined as the curved driving road, it becomes necessary to control vehicular height, rigidity, and damping of the vehicle traveling on the curved driving road ahead. In this case, the processor 130 controls the vehicular height, rigidity, and damping of the vehicle according to a preset stepwise control technique when the vehicle reaches one of a plurality of stepwise control points (refer to FIG. 3). The plurality of stepwise control points are predetermined according to a distance before or after the target point (the starting point for the curved driving road) for the curved driving road.

Figure 4:
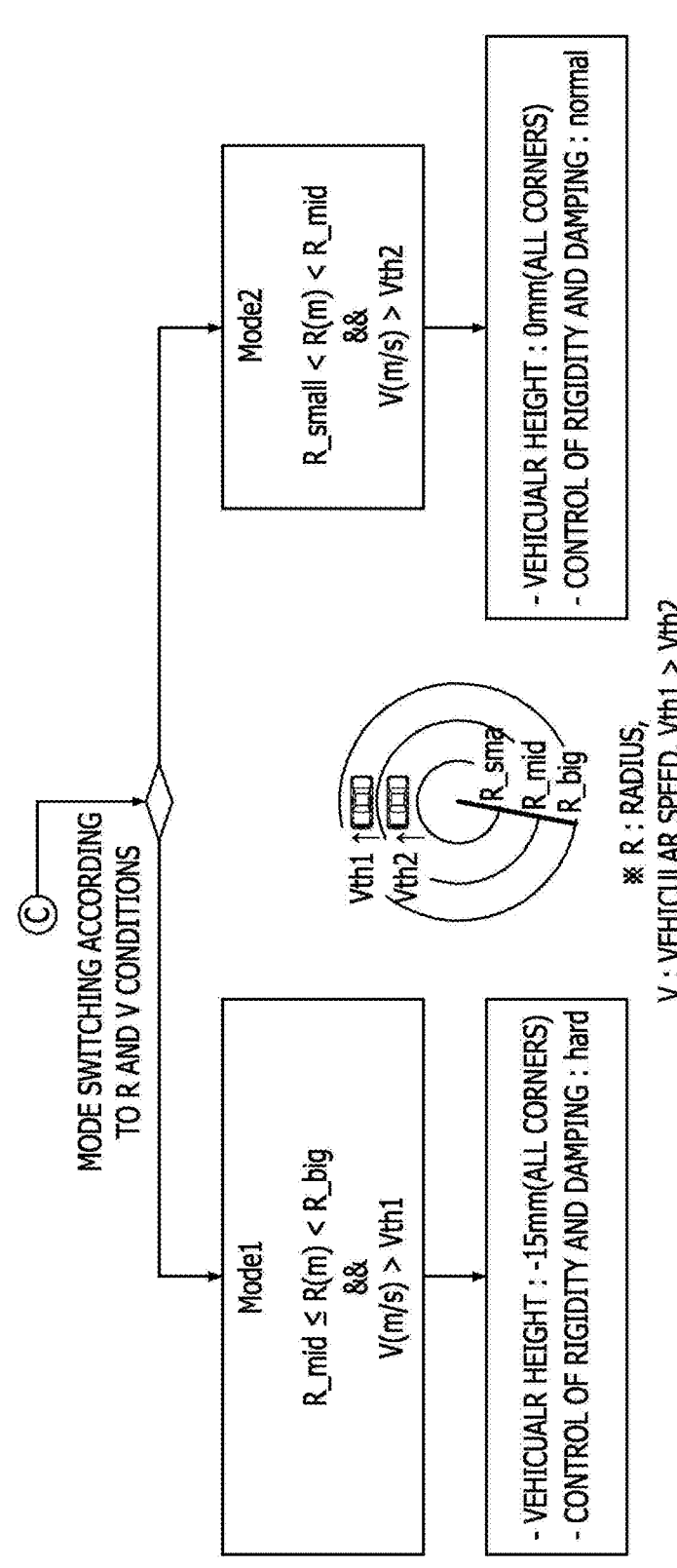
FIG. 4 is a flowchart that is referred to for the description of the method of controlling the vehicular height, rigidity, and damping of the vehicle on the basis of curvature information of a curved driving road and vehicular speed information of the vehicle, the method being illustrated in FIG. 2.

In addition, the processor 130 determines, on the basis of curvature information of the curved driving road ahead and vehicular speed information of the vehicle, whether or not it is necessary to control the vehicular height, rigidity, and damping (that is, whether or not lateral acceleration occurs), and controls the vehicular height, rigidity, and damping (refer to FIG. 4).

In addition, in order to control the vehicular height, rigidity, and damping of the vehicle, the processor 130 controls the vehicular behavior for enhancing the feeling of riding comfort on the curved driving road by controlling the suspension drive module 140 and the damper drive module 150.

That is, before the vehicle reaches the target point, the processor 130 controls the vehicular height, rigidity, and damping of the vehicle for enhancing (for example, enhancing, on the basis of evaluation results, the typical feeling of riding comfort that occupants experience) the feeling of riding comfort during the traveling on the curved driving road.

In response to a control signal of the processor 130, the suspension drive module 140 adjusts the vehicular height by driving a suspension (not illustrated).

In response to a control signal of the processor 130, the damper drive module 150 controls a damping force of a damper (not illustrated) installed between a vehicular body and each axle.

At this point, the suspension drive module 140 drives a suspension (for example, a multi-chamber air suspension) in a manner that corresponds to its type, and the damper drive module 150 drives a damper (for example, an air damper) in a manner that corresponds to its type.

FIG. 2 is a flowchart that is referred to for describing the method of controlling a vehicular suspension and damper according to the second embodiment of the present disclosure.

With reference to FIG. 2, the processor 130 determines, on the basis of information (particularly, curvature radius information of the road) received through the navigation module 120, whether or not a road that is at a predetermined distance (for example, 2 km) is the curved driving road) (S101 and S102).

For reference, the navigation module 120 provides the processor 130 with information on roads (an expressway, a low-speed road, a straight-line road, a curved road, and the like) on which the vehicle travels, on the basis of map data, when the vehicle is at a predetermined distance (for example, 2 km) before a target point (for example, the starting point for a curved driving road).

In addition, the processor 130 checks whether or not the vehicle reaches a stepwise control point (for example, refer to the points ⓐ, ⓑ, ⓒ, ⓓ, and ⓔ in FIG. 3) that are predetermined according to a distance before or after the target point for the curved driving road (for example, the starting point for the curved driving road) (S103).

Figure 3:
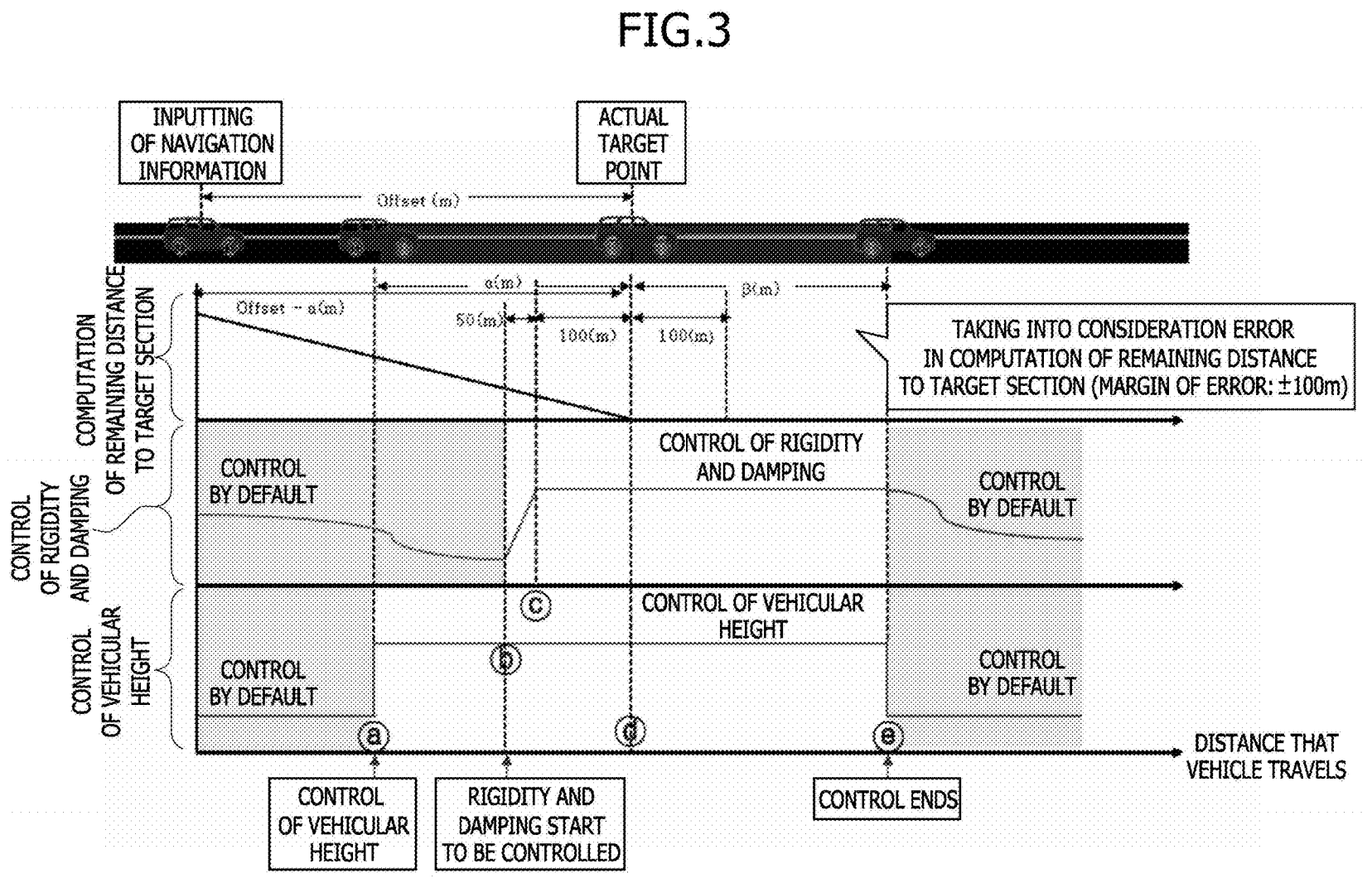

Depending on whether or not the vehicle reaches the predetermined stepwise control point (for example, refer to the points ⓐ, ⓑ, ⓒ, ⓓ, and ⓔ in FIG. 3), the processor 130 controls the vehicular height, rigidity, and damping of the vehicle through control by default or controls the vehicular height, rigidity according to a preset stepwise control technique (S104) (refer to FIG. 3).

FIG. 3 is a diagram that is referred to for description of the method of controlling the vehicular height, rigidity, and damping of the vehicle according to the preset stepwise control technique when the vehicle reaches the predetermined stepwise control point, the method being illustrated in FIG. 2.

With reference to FIG. 3, the processor 130 receives information on roads ahead (an expressway, a low-speed road, a straight-line road, a curved road, and the like) on which the vehicle is to travel, through the navigation module 120 when the traveling vehicle is at a distance greater than a first distance (indicated by Offset (m) in FIG. 3) (for example, 2 Km) away from the target point (for example, the starting point for the curved driving road).

Accordingly, the processor 130 determines, on the basis of curvature radius information of the road, whether or not the road ahead at the predetermined first distance (for example, 2 km) is a curved driving road. In a case where a road ahead is determined as the curved driving road, the starting point for the curved driving road is the target point (the ⓓ point).

When the vehicle, continuously traveling toward the target point, reaches a point (the ⓐ point) at a second distance $\alpha$(m) away from the target point, the processor 130 first starts to control the vehicular height (for example, a vehicular height control enabling signal, which is set to 'high,' is output, and thus processor 130 enables the control of the vehicular height.

For example, when the vehicular height control enabling signal is output as being 'high,' the processor 130 adjusts the vehicular height according to a predetermined speed.

When the vehicle, continuously traveling toward the target point (the ⓓ) point), reaches a point (the ⓑ point) at a third distance (100 (m)+50 (m)) away from the target point, the processor 130 starts to control the rigidity and damping (for example, a rigidity and damping control enabling signal is output in a manner that gradually becomes 'high,' according to a predetermined gradient, and thus the rigidity and damping are prevented from being abruptly changed).

At this point, the point (the ⓑ) point) that is supposed to be at the third distance (100 (m)+50 (m)) may be adjusted within the margin of error. In addition, the gradient at which the rigidity and damping control enabling signal is output may be adjusted. Moreover, a distance (that is, a distance between the points ⓑ and ⓒ), which serves as a reference for the control of the rigidity and damping, may be increased or decreased according to the gradient.

The processor 130 controls the vehicular height, rigidity, and damping of the vehicle according to the preset stepwise control technique, before the vehicle finishes traveling on the curved driving road (that is, a section between the points ⓓ and ⓔ).

At this point, the processor 130 controls the vehicular height, rigidity, and damping of the vehicle through control by default, before the vehicle reaches the point (the point ⓐ) at the second distance $\alpha$(m) away from the target point, and after the vehicle has already passed through an ending point (the point ⓔ) for the curved driving road.

FIG. 4 is a flowchart that is referred to for the description of the method of controlling the vehicular height, rigidity, and damping of the vehicle on the basis of the curvature information of the curved driving road and the vehicular speed information of the vehicle, the method being illustrated in FIG. 2.

For reference, the term curvature (the degree to which curving occurs) and the term curvature radius (that is, the radius of the osculating circle at a particular point on a curve) have semantically different meanings. However, it is preferred that their substantial meanings not be interpreted as different. The reason for this is that the reciprocal of the radius of the osculating circle is the same as the curvature, indicating that the greater the radius of the osculating circle on a curved line, the smaller the curvature because the degree of being curved is lowered and that, conversely, the smaller the radius of the osculating circle, the greater the curvature (refer to a circular image in FIG. 4).

With reference to FIG. 4, when the vehicle enters a section (from the point ⓐ to the point ⓔ in FIG. 3) where the vehicular height, rigidity, and damping of the vehicle can be controlled, on the basis of information including curvature R of the curved driving road and vehicular speed V of the vehicle, the processor 130 controls the necessary vehicular height, rigidity, and damping of the vehicle when predetermined conditions (conditions for Mode 1 and Mode 2) are satisfied.

At this point, the first condition (that is, the condition for Mode 1) is that a curvature radius R(m) of the curved driving road on which the vehicle currently travels is smaller than a first curvature radius R_big of the curved driving road and equal to or greater than a second curvature radius R-mid (R_mid≤R(m)<R_big) and that a vehicular speed V(m/s) is greater than a first reference speed Vth1 (V(m/s)>Vth1). Under the first condition, the processor 130 controls the vehicular height to decrease by a set amount (for example, −15 mm) and controls the rigidity and damping to increase to a high level (for example, hard).

That is, the first condition (that is, the condition for Mode 1) is a condition that applies when a lateral acceleration, having a relatively high value when compared with a reference value, occurs and that a large amount of vehicular behavior control is thus required.

In addition, the second condition (that is, the condition for Mode2) is that the curvature radius R(m) of the curved driving road on which the vehicle currently travels is smaller than the second curvature radius R_mid of the curved driving road and equal to or greater than a third curvature radius R-small (R_small≤R(m)<R_mid), and that the vehicular speed V(m/s) is greater than a second reference speed Vth2 (V(m/s)>Vth2). Under the second condition, the processor 130 controls the vehicular height to maintain a normal height (for example, 0 mm) (for example, to maintain a normal height to increase to a normal height when adjusted to be smaller than the normal height, or to decrease to a normal height when adjusted to be greater than the normal height) and controls the rigidity and damping to maintain their respective normal states (for example, normal) (for example, to maintain their respective normal states to decrease to a low level, when adjusted to be harder than in the normal state, or to increase to a high level, when adjusted to be softer than in the normal state.

That is, the second condition (that is, the condition for Mode 2), is a condition that applies when the lateral acceleration, having a relatively low value when compared with the reference value, occurs and that a small amount of vehicular behavior control is thus required.

At this point, a curvature radius R of the curved driving road satisfies R_big>R_mid>R_small, and a vehicular speed V satisfies Vth1>Vth2.

As described above, according to the present invention, the feeling of riding comfort is adjusted by controlling the vehicular suspension and damper on the curved driving road. Thus, the stability and the feeling of riding comfort can be enhanced.

The embodiment of the present disclosure is described only in an exemplary manner with reference to the drawings. It would be understood by a person of ordinary skill in the art to which the present disclosure pertains that various modifications could be made to the embodiment and that various equivalents thereof could be implemented. Thus, the technical scope of the present disclosure should be defined by the following claims. In addition, the features described in the present specification may be realized, for example, in the form of a method, a process, an apparatus, a software program, a data stream, or a signal. The features, although described in terms of realization in a single form (for example, described as only a method), may also be realized in other forms (for example, an apparatus or a program). The apparatus may be implemented in the form of adequate hardware, software, firmware, or the like. The method may be realized, for example, in computers or microprocessors. Furthermore, the method may be realized in processors that usually refer to processing devices including an integrated circuit, a programmable logic device, and the like. The processors include those that are used in computers, cellular phones, personal digital assistants ("PDAs"), and other communication devices that facilitate communication of information between end users.

What is claimed is:

1. An apparatus for controlling a vehicular suspension and damper, the apparatus comprising:
   a navigation module configured to provide a processor with information on a road on which a vehicle travels; and
   the processor configured to determine, based on curvature radius information included in the information received through the navigation module, whether or not a road ahead is a curved driving road and in response to a determination that the road ahead is the curved driving road, the processor configured to determine whether or not it is necessary to control vehicular height, rigidity, and damping of a vehicle on the curved driving road,
   wherein the processor controls the vehicular height, rigidity, and damping of the vehicle according to a preset stepwise control technique when the vehicle reaches a plurality of stepwise control points,
   wherein the processor is configured to determine the plurality of stepwise control points according to a distance before or after a target point for the curved driving road, which corresponds to a starting point for the curved driving road.

2. The apparatus of claim 1, further comprising:
   a suspension drive module configured to adjust the vehicular height by driving the vehicular suspension in response to a control signal of the processor; and
   a damper drive module configured to control a damping force of a damper installed between a vehicular body and each axle in response to a control signal of the processor.

3. The apparatus of claim 1, wherein the processor is configured to control the vehicular height, rigidity, and damping through control by default or control the vehicular height, rigidity, and damping according to the preset stepwise control technique, depending on whether or not the vehicle reaches the plurality of stepwise control points.

4. The apparatus of claim 1, wherein the processor is configured to output a vehicular height control enabling signal for starting to control the vehicular height when the vehicle reaches a point at a second distance away from the target point.

5. The apparatus of claim 1, wherein the processor is configured to gradually output a vehicular height control enabling signal for starting to control the rigidity and damping, according to a predetermined gradient when the vehicle reaches a point at a third distance away from the target point.

6. The apparatus of claim 1, wherein the processor is configured to control the vehicular height, rigidity, and damping through control by default before the vehicle reaches a point at a second distance away from the target point and after the vehicle passes through an ending point for the curved driving road.

7. The apparatus of claim 1, wherein the processor is configured to control the vehicular height, rigidity, and damping in a predetermined condition, but controls the vehicular height to decrease to a lower level than in a current state and controls the rigidity and damping to increase to a higher level than in a current state, under a predetermined first condition (a condition for Mode 1) that a curvature radius R(m) of the curved driving road on which the vehicle currently travels is smaller than a first curvature radius R_big of the curved driving road and equal to or greater than a second curvature radius R-mid (R_mid≤R(m)<R_big) and that a vehicular speed V(m/s) is greater than a first reference speed Vth1 (V(m/s)>Vth1).

8. The apparatus of claim 1, wherein the processor is configured to control the vehicular height, rigidity, and damping in a predetermined condition, but controls the vehicular height to return to a predetermined normal height and controls the rigidity and damping to return to respective predetermined normal states thereof, under a second condition (a condition for Mode 2) that a curvature radius R(m) of the curved driving road on which the vehicle currently travels is smaller than a second curvature radius R_mid of the curved driving road and equal to or greater than a third curvature radius R-small (R_small≤R(m)<R_mid), and that a vehicular speed V(m/s) is greater than a second reference speed Vth2 (V(m/s)>Vth2).

9. A method of controlling a vehicular suspension and damper, the method comprising:

receiving, by a processor, information on a road on which a vehicle currently travels, through a navigation module;

determining, by the processor, based on curvature radius information included in the received information, whether or not a road ahead is a curved driving road;

in response to a determination that the road ahead is the curved driving road, determining, by the processor, whether or not it is necessary to control vehicular height, rigidity, and damping of the vehicle on the curved driving road; and in response to a determination that it is necessary to control vehicular height, rigidity, and damping of the vehicle on the curved driving road, controlling, by the processor, the vehicular height, rigidity, and damping of the vehicle according to a preset stepwise control technique when the vehicle reaches a plurality of stepwise control points, the method further comprising:

determining the plurality of stepwise control points according to a distance before or after a target point for the curved driving road, which corresponds to a starting point for the curved driving road.

10. The method according to claim 9, further comprising:
adjusting the vehicular height by driving the vehicular suspension in response to a control signal of the processor; and
controlling a damping force of a damper installed between a vehicular body and each axle in response to a control signal of the processor.

11. The method according to claim 9, further comprising:
controlling the vehicular height, rigidity, and damping through control by default or control the vehicular height, rigidity, and damping according to the preset stepwise control technique, depending on whether or not the vehicle reaches the plurality of stepwise control points.

12. The method according to claim 9, further comprising:
outputting a vehicular height control enabling signal for starting to control the vehicular height when the vehicle reaches a point at a second distance away from the target point.

13. The method according to claim 9, further comprising:
gradually outputting a vehicular height control enabling signal for starting to control the rigidity and damping, according to a predetermined gradient when the vehicle reaches a point at a third distance away from the target point.

14. The method according to claim 9, further comprising:
controlling the vehicular height, rigidity, and damping through control by default before the vehicle reaches a point at a second distance away from the target point and after the vehicle passes through an ending point for the curved driving road.

15. The method according to claim 9, further comprising:
controlling the vehicular height, rigidity, and damping in a predetermined condition, but controls the vehicular height to decrease to a lower level than in a current state and controls the rigidity and damping to increase to a higher level than in a current state, under a predetermined first condition (a condition for Mode 1) that a curvature radius R(m) of the curved driving road on which the vehicle currently travels is smaller than a first curvature radius R_big of the curved driving road and equal to or greater than a second curvature radius R-mid (R_mid≤R(m)<R_big) and that a vehicular speed V(m/s) is greater than a first reference speed Vth1 (V(m/s)>Vth1).

16. The method according to claim 9, further comprising:
controlling the vehicular height, rigidity, and damping in a predetermined condition, but controls the vehicular height to return to a predetermined normal height and controls the rigidity and damping to return to respective predetermined normal states thereof, under a second condition (a condition for Mode 2) that a curvature radius R(m) of the curved driving road on which the vehicle currently travels is smaller than a second curvature radius R_mid of the curved driving road and equal to or greater than a third curvature radius R-small (R_small≤R(m)<R_mid), and that a vehicular speed V(m/s) is greater than a second reference speed Vth2 (V(m/s)>Vth2).

* * * * *